United States Patent
Hunt et al.

(10) Patent No.: US 9,102,794 B2
(45) Date of Patent: Aug. 11, 2015

(54) POLYESTERS CONTAINING METATHESIZED NATURAL OIL DERIVATIVES AND METHODS OF MAKING

(71) Applicant: Elevance Renewable Sciences, Inc., Woodridge, IL (US)

(72) Inventors: Zachary Hunt, Simpsonville (SC); S. Alexander Christensen, Northwoods, IL (US)

(73) Assignee: Elevance Renewable Sciences, Inc., Woodridge, IL (US)

(*) Notice: Subject to any disclaimer, the term of this patent is extended or adjusted under 35 U.S.C. 154(b) by 0 days.

(21) Appl. No.: 14/284,061

(22) Filed: May 21, 2014

(65) Prior Publication Data

US 2014/0364581 A1    Dec. 11, 2014

Related U.S. Application Data (60) Provisional application No. 61/829,667, filed on May 31, 2013.

(51) Int. Cl.

| | |
|---|---|
| *C08G 64/00* | (2006.01) |
| *C08G 63/685* | (2006.01) |
| *C08G 63/78* | (2006.01) |
| *C08G 63/02* | (2006.01) |

(52) U.S. Cl.
CPC ........ *C08G 63/6854* (2013.01); *C08G 63/6856* (2013.01); *C08G 63/6858* (2013.01); *C08G 63/78* (2013.01)

(58) Field of Classification Search
USPC .......... 528/176, 190, 193, 194, 271, 272, 291
See application file for complete search history.

(56) References Cited

U.S. PATENT DOCUMENTS

| | | | |
|---|---|---|---|
| 2009/0264672 A1 | 10/2009 | Abraham et al. | |
| 2010/0240857 A1* | 9/2010 | Bruchmann et al. | 528/272 |
| 2011/0160472 A1 | 6/2011 | Lemke et al. | |
| 2012/0245063 A1 | 9/2012 | DiBiase et al. | |
| 2012/0264662 A1 | 10/2012 | DiBiase et al. | |
| 2012/0264664 A1 | 10/2012 | DiBiase et al. | |
| 2012/0277133 A1 | 11/2012 | DiBiase et al. | |
| 2012/0283156 A1 | 11/2012 | DiBiase et al. | |
| 2013/0085288 A1 | 4/2013 | Snead et al. | |

FOREIGN PATENT DOCUMENTS

| | | |
|---|---|---|
| AR | 080843 | 5/2012 |
| AU | 2010307021 | 4/2011 |
| CA | 2804668 | 1/2012 |
| KR | 20120086312 | 8/2012 |
| MX | 2012004257 | 4/2011 |
| WO | 2011046872 | 4/2011 |
| WO | 2012061110 | 1/2012 |
| WO | 2012061092 | 5/2012 |
| WO | 2012061093 | 5/2012 |
| WO | 2012061094 | 5/2012 |
| WO | 2012061095 | 5/2012 |
| WO | 2012061098 | 5/2012 |
| WO | 2012061101 | 5/2012 |
| WO | 2012061103 | 5/2012 |
| WO | 2012061106 | 5/2012 |
| WO | 2012061108 | 5/2012 |
| WO | 2012128788 | 9/2012 |
| WO | 2012129477 | 9/2012 |
| WO | 2012129482 | 9/2012 |
| WO | 2012129490 | 9/2012 |
| WO | 2012138513 | 10/2012 |
| WO | 2012006324 | 11/2012 |

OTHER PUBLICATIONS

Angewandte Chemie International Edition, 2003, vol. 42, No. 38, Publisher: A Journal of the Gesellschaft Deutscher Chemiker: Angewandte Chemie International Edition.
"Chemical Reviews", Aug. 2009, pp. 3211-3226, vol. 109, No. 8, Publisher: American Chemical Society.
"Chemical Reviews", Jan. 2002, pp. 145-179, vol. 102, No. 1, Publisher: American Chemical Society.

* cited by examiner

*Primary Examiner* — Terressa Boykin
(74) *Attorney, Agent, or Firm* — Blanchard & Associates (57) ABSTRACT

A polymeric composition includes the reaction product of monomers, where the monomers include a first monomer having at least two carboxylate functional groups, and a second monomer having at least two hydroxyl functional groups. The second monomer is a reaction product of a metathesized natural oil and a bis(hydroxyalkyl) amine.

26 Claims, 5 Drawing Sheets

```
┌─────────────────────────────────────────────────────────────┐
│ Forming a reaction mixture 210 containing:                  │── 201
│ - a first monomer 212 having at least two carboxylate functional groups, │
│ - a second monomer 214 having at least two hydroxyl functional groups, and │
│ - optionally other monomers 216.                            │
└─────────────────────────────────────────────────────────────┘
                              │
                              ▼
        ┌──────────────────────────────────────────┐
        │ Forming a product mixture 220 containing a │── 202
        │ polyester 222 formed from the monomers 212,│
        │ 214, and optionally 216.                   │
        └──────────────────────────────────────────┘
              │                           │
              ▼                           ▼
   ┌──────────────────────────┐  ┌──────────────────────┐
203─│ Combining the polyester 222 with at │  │ Crosslinking the     │── 204
   │ least one other material 230.       │  │ polyester 222.       │
   └──────────────────────────┘  └──────────────────────┘
```

POLYESTERS CONTAINING METATHESIZED NATURAL OIL DERIVATIVES AND METHODS OF MAKING

REFERENCE TO RELATED APPLICATIONS

This application claims the benefit of U.S. Provisional Application No. 61/829,667 entitled "Polyesters Containing Metathesized Natural Oil Derivatives And Methods Of Making" filed May 31, 2013, which is incorporated by reference in its entirety.

BACKGROUND

Polyesters, which are polymers containing an ester group (—C(=O)—O—C—) as part of their repeating chemical structure, are used in a wide variety of applications. Polyester fibers may be used in textiles and as reinforcing fibers in rubbers or in rigid composite materials. Polyester films or coatings may be flexible or rigid, with representative applications including but not limited to food or beverage containers, metallized films and photographic films and tapes. Representative applications of rigid polyester plastics including but are not limited to housings for electronic devices and automotive parts.

As with polymers in general, the physical properties of a polyester are determined by the chemical structure of the polyester, the nature of any other ingredients added to the polyester, and the processing techniques used to form a material from the polyester. For example, the chemical structure of a polyester may include aromatic and/or aliphatic organic groups. Alteration of the chemical structure, size and/or frequency of these groups in a polyester can allow for modification of the properties of the polymer.

It is desirable to expand the chemical structures present in polyesters, so as to expand the useful properties that can be provided by the polymers. For example, properties such as flexibility, toughness, etc. can be improved by incorporating chemical groups that lower the modulus or that can absorb energy, respectively. This expansion of chemical structures may be accomplished through post-polymerization processing, such as reaction with other reagents or blending with other polymers. It is especially desirable, however, to expand the chemical structures by introducing new chemical structures in the monomeric building blocks from which the polymer is formed.

It would be desirable to provide polyesters that include chemical groups not previously observed in a polyester. Preferably such modified polyesters can be formed using conventional synthetic techniques and equipment, without requiring post-polymerization treatment. Preferably the modified polyesters can be formed using monomeric building blocks that are readily available and inexpensive.

SUMMARY

The scope of the present invention is defined solely by the appended claims, and is not affected to any degree by the statements within this summary.

In one aspect, a polymeric composition is provided that includes the reaction product of monomers, where the monomers include a first monomer having at least two carboxylate functional groups, and a second monomer having at least two hydroxyl functional groups. The second monomer is a reaction product of a metathesized natural oil and a bis(hydroxyalkyl)amine.

In another aspect, a method of making a polymeric composition is provided that includes forming a reaction mixture containing a first monomer having at least two carboxylate functional groups, and a second monomer having at least two hydroxyl functional groups. The second monomer is the reaction product of a metathesized natural oil and a bis(hydroxyalkyl)amine. The method further includes forming a product mixture containing a polyester formed from the first monomer and the second monomer.

In another aspect, a polymeric composition is provided that includes a polyester having Structure IV:

Structure IV where $X_2$ is a $C_4$-$C_{28}$ alkyl group or alkenyl group from a metathesized natural oil, $X_4$ is a $C_4$-$C_{28}$ alkyl group or alkenyl group from the metathesized natural oil that is bonded to another polymer chain through a C—N bond, and y, z and n independently are at least 1.

In another aspect, a polymeric composition is provided that includes a polyester having Structure V:

Structure V where $X_2$ is a $C_4$-$C_{28}$ alkyl group or alkenyl group from a metathesized natural oil, $X_4$ is a $C_4$-$C_{28}$ alkyl group or alkenyl group from the metathesized natural oil that is bonded to another polymer chain through a C—N bond, and y, z and n independently are at least 1.

BRIEF DESCRIPTION OF THE DRAWINGS

The invention can be better understood with reference to the following drawings and description. The components in the figures are not necessarily to scale and are not intended to accurately represent molecules or their interactions, emphasis instead being placed upon illustrating the principles of the invention. Moreover, in the figures, like referenced numerals designate corresponding parts throughout the different views.

DETAILED DESCRIPTION

A polymeric composition includes a reaction product of a monomer having at least two carboxylate functional groups, and a monomer having at least two hydroxyl functional groups, where the monomer having at least two hydroxyl functional groups includes a group derived from a metathesized natural oil. The use of a monomer containing a metathesized natural oil derivative can provide additional options for providing polymeric materials having useful combinations of properties, including but not limited to mechanical properties, crosslink density, and post-polymerization reactivity. The use of a monomer containing a metathesized natural oil derivative also may provide certain advantages over commercial polymeric materials, including but not limited to simpler and/or more cost-effective production, reduced variability, improved sourcing, and increased biorenewability.

A polymeric composition includes the reaction product of monomers, including a first monomer having at least two carboxylate functional groups, and a second monomer having at least two hydroxyl functional groups. The second monomer is a reaction product of a metathesized natural oil and a bis(hydroxyalkyl)amine.

A polymeric composition may be any composition that includes a polymeric substance. The polymeric composition may have any of a variety of forms, including but not limited to monolithic solid, porous solid, coating, membrane, foam, fiber, particle, gel, liquid, or mixtures of these. The polymeric composition may be one of many components in a homogeneous or heterogeneous mixture.

The polymeric composition includes a polymeric substance that is the reaction product of monomers that include a first monomer having at least two carboxylate functional groups (—C(=O)—), and a second monomer having at least two hydroxyl functional groups (—OH). The first monomer having at least two carboxylate functional groups may include a carboxylic acid group (—C(=O)OH), an acyl halide group (—C(=O)X, where X is F, Cl, Br or I), an ester group (—C(=O)O—C—), an anhydride group (—C(=O)O—C(=O)—), or mixtures of these. A first monomer may have a single anhydride group, as this functional group includes two carboxylate groups.

The first monomer having at least two carboxylate functional groups may include two carboxylic acid groups, two acyl halide groups, two ester groups or an anhydride group. The first monomer having at least two carboxylate functional groups may include one or more carboxylic acid groups, in combination with one or more acyl halide groups, one or more ester groups and/or one or more anhydride groups.

A hydroxyl functional group can undergo a condensation reaction with a carboxylic acid group, an acyl halide group, an ester group or an anhydride group to form an ester group (—C(=O)O—C—), which covalently links the substance that was bonded to the carboxylic acid, acyl halide, ester or anhydride group and the substance that was bonded to the hydroxyl group. See, for example, Scheme 1, in which $R_A$, $R_B$, $R_{B'}$, and $R_Z$ are organic groups, and X is a halide selected from F, Cl, Br and I.

Scheme 1

Multiple condensation reactions between monomers having at least two carboxylate functional groups, and monomers having at least two hydroxyl functional groups can form an extended chain or network that contains multiple ester groups, each of which covalently links the substances that were bonded to the carboxylate groups and the substances that were bonded to the hydroxyl groups. See, for example, the polymerization reaction of a diol monomer and a diacid monomer depicted in Scheme 2, in which $R_C$ and $R_D$ are organic groups, and n is at least 1.

Scheme 2

The extended chain or network is a polymeric substance, typically referred to as a "polyester" due to the prevalence of ester groups in the substance.

The polymeric substance may include groups other than ester groups as the covalent linkage between the substances that were bonded to the hydroxyl groups and the substances that were bonded to the carboxylate groups. For example, side reactions can form anhydride groups within the polymer chain. Accordingly, the term "polyester" is not limited to polymeric substances that include only ester linkages, but also includes any polymeric substances that are the reaction products of monomers that include a monomer having at least two carboxylate functional groups, and a monomer having at least two hydroxyl functional groups.

The first monomer having at least two carboxylate functional groups may include a diacid monomer, such as malonic acid, succinic acid, glutaric acid, adipic acid, suberic acid, azelaic acid, sebacic acid, dodecanedioic acid, terephthalic acid, 2,6-naphthalic acid and the like, and combinations thereof. The first monomer may include a diacyl halide monomer, such as malonyl chloride, succinyl chloride, glutaryl chloride, adipoyl chloride, suberyl chloride, azelaoyl chloride, sebacyl chloride, dodecanedioyl chloride, terephthaloyl chloride, 2,6-naphthaloyl chloride and the like, and combinations thereof. The first monomer may include a diester monomer, such as dimethyl malonate, dimethyl succinate, dimethyl glutarate, dimethyl adipate, dimethyl suberate, dimethyl azelate, dimethyl sebacate, dimethyl dodecanoate, dimethyl terephthate, 2,6-dimethyl naphthate and the like, and combinations thereof. The first monomer may include an anhydride monomer, such as succinic anhydride, glutaric anhydride, phthalic anhydride, naphthalic anhydride and the like, and combinations thereof.

The first monomer having at least two carboxylate functional groups may include a prepolymer having the two functional groups, such as a prepolymer in the form of a polymer chain having two ends, where each end includes a carboxylate functional group. Examples of such prepolymers also include but are not limited to the reaction product of an excess of one or more monomers having at least two carboxylate functional groups, with one or more monomers having at least two hydroxyl functional groups but that do not include a derivative of a metathesized natural oil.

An example of a first monomer having at least two carboxylate functional groups is octadecandioic acid (ODDA). U.S. Published Patent Application No. 2009/0264672, assigned to the same assignee as the present invention, describes a process for making diacids, such as ODDA, as well as the corresponding diesters and salts, through metathesis of unsaturated esters. Accordingly, the entire content of U.S. Published Patent Application No. 2009/0264672 is incorporated herein by reference.

The second monomer having at least two hydroxyl functional groups includes the reaction product of a metathesized natural oil and a bis(hydroxyalkyl) amine. In one example, the reaction product of a metathesized natural oil and a bis(hydroxyalkyl) amine may be represented by Structure I:

Structure I where $R_3$, as noted in Structure I, is either H or is a bis(hydroxyalkyl) amide group; $R_1$, $R_2$, $R_4$ and $R_5$ independently are $C_2$-$C_{12}$ alkyl groups; and $X_1$ is a $C_4$-$C_{28}$ alkyl group or alkenyl group from the metathesized natural oil. When $R_3$ is H, a second monomer having Structure I is a monofunctional monomer, which means it includes a single di-hydroxyl functional group. When $R_3$ is a bis(hydroxyalkyl) amide group, a second monomer having Structure I is a difunctional monomer, which means it includes two di-hydroxyl functional groups.

The metathesized natural oil used to form the second monomer may be the product of a metathesis reaction of a natural oil in the presence of a metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in paragraphs [0069]-[0155] of US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst comprises a transition metal. In some embodiments, the metathesis catalyst comprises ruthenium. In some embodiments, the metathesis catalyst comprises rhenium. In some embodiments, the metathesis catalyst comprises tantalum. In some embodiments, the metathesis catalyst comprises nickel. In some embodiments, the metathesis catalyst comprises tungsten. In some embodiments, the metathesis catalyst comprises molybdenum.

In some embodiments, the metathesis catalyst comprises a ruthenium carbene complex and/or an entity derived from such a complex. In some embodiments, the metathesis catalyst comprises a material selected from the group consisting of a ruthenium vinylidene complex, a ruthenium alkylidene complex, a ruthenium methylidene complex, a ruthenium benzylidene complex, and combinations thereof, and/or an entity derived from any such complex or combination of such complexes. In some embodiments, the metathesis catalyst comprises a ruthenium carbene complex comprising at least one phosphine ligand and/or an entity derived from such a complex. In some embodiments, the metathesis catalyst comprises a ruthenium carbene complex comprising at least one tricyclohexylphosphine ligand and/or an entity derived from such a complex. In some embodiments, the metathesis catalyst comprises a ruthenium carbene complex comprising at least two tricyclohexylphosphine ligands [e.g., $(PCy_3)_2$ $Cl_2Ru=CH—CH=C(CH_3)_2$, etc.] and/or an entity derived from such a complex. In some embodiments, the metathesis catalyst comprises a ruthenium carbene complex comprising at least one imidazolidine ligand and/or an entity derived from such a complex. In some embodiments, the metathesis catalyst comprises a ruthenium carbene complex comprising an isopropyloxy group attached to a benzene ring and/or an entity derived from such a complex.

In some embodiments, the metathesis catalyst comprises a Grubbs-type olefin metathesis catalyst and/or an entity derived therefrom. In some embodiments, the metathesis catalyst comprises a first-generation Grubbs-type olefin metathesis catalyst and/or an entity derived therefrom. In some embodiments, the metathesis catalyst comprises a second-generation Grubbs-type olefin metathesis catalyst and/or an entity derived therefrom. In some embodiments, the metathesis catalyst comprises a first-generation Hoveda-Grubbs-type olefin metathesis catalyst and/or an entity derived therefrom. In some embodiments, the metathesis catalyst comprises a second-generation Hoveda-Grubbs-type olefin metathesis catalyst and/or an entity derived therefrom. In some embodiments, the metathesis catalyst comprises one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no, 373640-75-6).

In some embodiments, the metathesis catalyst comprises a molybdenum and/or tungsten carbene complex and/or an entity derived from such a complex. In some embodiments, the metathesis catalyst comprises a Schrock-type olefin metathesis catalyst and/or an entity derived therefrom. In some embodiments, the metathesis catalyst comprises a high-oxidation-state alkylidene complex of molybdenum and/or an entity derived therefrom. In some embodiments, the metathesis catalyst comprises a high-oxidation-state alkylidene complex of tungsten and/or an entity derived therefrom. In some embodiments, the metathesis catalyst comprises molybdenum (VI). In some embodiments, the metathesis catalyst comprises tungsten (VI). In some embodiments, the metathesis catalyst comprises a molybdenum- and/or a tungsten-containing alkylidene complex of a type described in one or more of (a) *Angew. Chem. Int. Ed. Engl.,* 2003, 42, 4592-4633; (b) *Chem. Rev.,* 2002, 102, 145-179; and/or (c) *Chem. Rev.,* 2009, 109, 3211-3226, each of which is incorporated by reference herein in its entirety, except that in the event of any inconsistent disclosure or definition from the present specification, the disclosure or definition herein shall be deemed to prevail.

Figure 1:
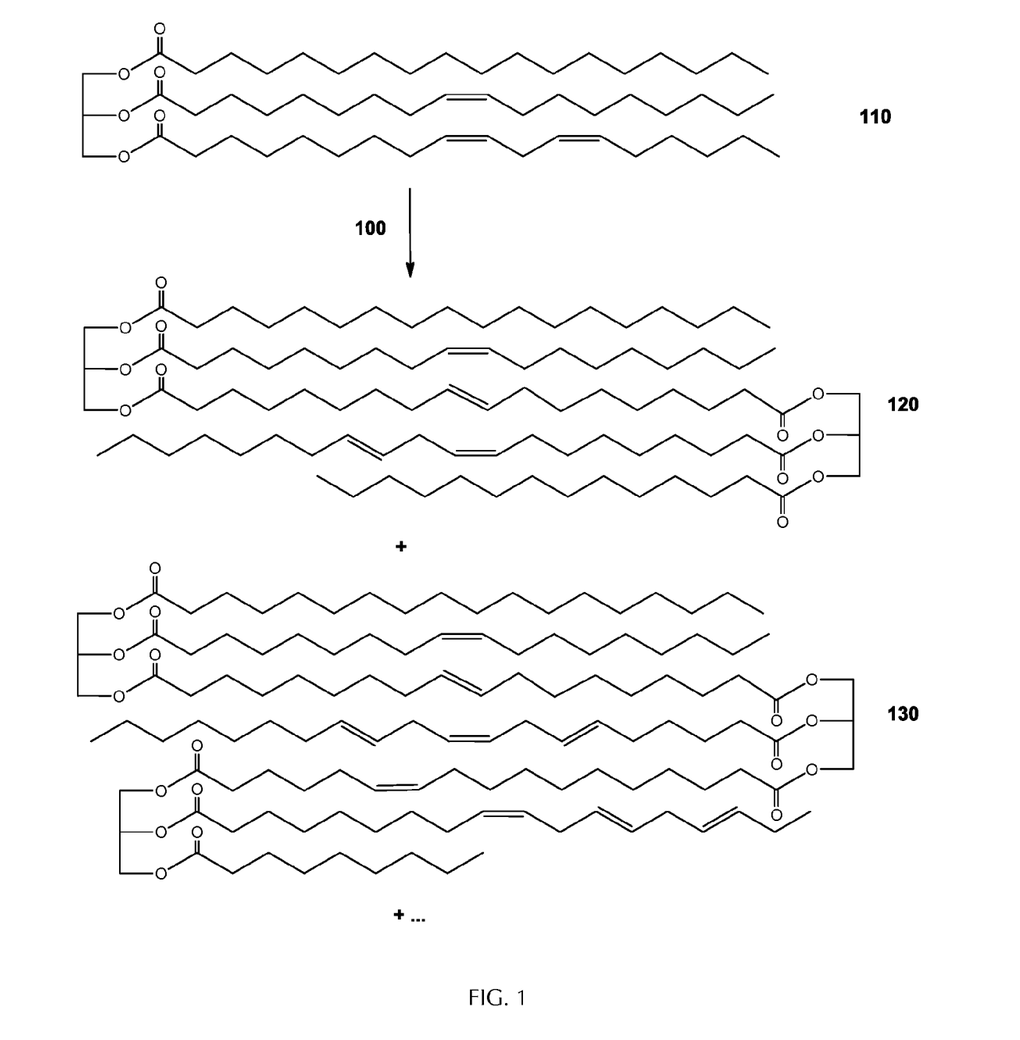
FIG. 1 depicts a reaction scheme for a metathesis reaction of a natural oil.

Metathesis is a catalytic reaction that involves the interchange of alkylidene units among compounds containing one or more double bonds (i.e., olefinic compounds) via the formation and cleavage of the carbon-carbon double bonds. The metathesis reaction of a natural oil containing unsaturated polyol esters can produce oligomers of the unsaturated polyol esters. The resulting oligomers typically contain a mixture of olefins and esters that may include one or more of metathesis monomers, metathesis dimers, metathesis trimers, metathesis tetramers, metathesis pentamers, and higher order metathesis oligomers (e.g., metathesis hexamers, etc.). FIG. 1 depicts chemical structures and reaction schemes related to a metathesis reaction 100 of a natural oil 110, producing metathesis dimer 120, metathesis trimer 130 and higher order metathesis oligomers (not pictured). A metathesis dimer refers to a compound formed when two unsaturated polyol ester molecules are covalently bonded to one another by a metathesis reaction. The molecular weight of the metathesis dimer typically is greater than the molecular weight of the individual unsaturated polyol ester molecules from which the dimer is formed. A metathesis trimer refers to a compound formed when three unsaturated polyol ester molecules are covalently bonded together by metathesis reactions. A metathesis trimer may be formed by the cross-metathesis of a metathesis dimer with an unsaturated polyol ester. A metathesis tetramer refers to a compound formed when four unsaturated polyol ester molecules are covalently bonded together by metathesis reactions. A metathesis tetramer may be formed by the cross-metathesis of a metathesis trimer with an unsaturated polyol ester. Metathesis tetramers may also be formed, for example, by the cross-metathesis of two metathesis dimers. Higher order metathesis oligomers (such as metathesis pentamers, metathesis hexamers, and the like) also may be formed.

The metathesized natural oil may be derived from natural oils such as vegetable oil, algal oil, animal fat, tall oil, derivatives of these oils, or mixtures thereof. Examples of vegetable oils include but are not limited to canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, castor oil, and the like, and combinations thereof. Examples of animal fats include but are not limited to lard, tallow, poultry fat, yellow grease, fish oil, and the like, and combinations thereof. Examples of natural oil derivatives include but are not limited to metathesis oligomers, gums, phospholipids, soapstock, acidulated soapstock, distillate or distillate sludge, fatty acids and fatty acid alkyl ester such as 2-ethylhexyl ester, hydroxyl-substituted variations of the natural oil, and the like, and combinations thereof. For example, the natural oil derivative may be a fatty acid methyl ester (FAME) derived from the glyceride of the natural oil.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

The metathesized natural oil may be a metathesized vegetable oil, a metathesized algal oil, a metathesized animal fat, a metathesized tall oil, a metathesized derivatives of these oils, or a mixture thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

The bis(hydroxyalkyl)amine used to form the second monomer may be any secondary amine that includes two hydroxyalkyl groups bonded to the amine nitrogen through C—N bonds. The bis(hydroxyalkyl)amine may be represented by Structure II:

Structure II where $R_1$ and $R_2$ are as described above regarding Structure I. The two hydroxyalkyl groups ($R_1$—OH and $R_2$—OH) may be the same, or they may be different. The hydroxyl group may be at any of a number of positions within the hydroxyalkyl group. Preferably at least one of the hydroxyalkyl groups is a ω-hydroxyalkyl group, in which the hydroxyl group is at the end opposite the C—N bond. Examples of bis(hydroxyalkyl)amines include bis(2-hydroxypropyl) amine and N,N-2-hydroxypropyl-ethanolamine. Examples of bis(ω-hydroxyalkyl)amines include but are not limited to diethanolamine.

The reaction product of a metathesized natural oil and a bis(hydroxyalkyl)amine may be formed by reacting the metathesized natural oil and the bis(hydroxyalkyl)amine in a reaction mixture. The reaction mixture may include a base and/or be maintained at an elevated temperature. The reaction mixture also may include a solvent. The metathesized natural oil, bis(hydroxyalkyl)amine and optional base and/or solvent may be combined simultaneously or in any order.

In some embodiments, the amount of bis(hydroxyalkyl) amine present in the reaction mixture may be between about 0.1 percent by weight (wt %) and about 30 wt % of the metathesized natural oil in the reaction mixture. The amount of bis(hydroxyalkyl)amine in the reaction mixture also may be expressed in terms of the ratio of amine equivalents in the bis(hydroxyalkyl)amine to ester equivalents in the metathesized natural oil (A:E ratio). For example, in some embodiments, the A:E ratio may be between about 1:100 and about 10:1, or between about 1:10 and about 5:1. In another example, the A:E ratio may be about 1:3, about 2:3, about 1:2, or about 1:1.

In some embodiments, a base may be present in the reaction mixture to increase the rate of reaction between the bis(hydroxyalkyl)amine and the metathesized natural oil. Examples of bases include but are not limited to sodium carbonate, lithium carbonate, sodium methoxide, potassium hydroxide, sodium hydride, potassium butoxide, potassium carbonate, or mixtures of these. The base may be added to the reaction mixture neat or as a mixture with a solvent such as water, alcohol, or another organic solvent. In some embodiments, the amount of base in the reaction mixture may be between about 0.1 wt % and about 10 wt % of the metathesized natural oil in the reaction mixture, or between about 1 wt % and about 15 wt % of the metathesized natural oil. In some embodiments, the amount of base in the reaction mixture may be between about 1 wt % and about 10 wt % of the metathesized natural oil, between about 0.1 wt % and about 1.0 wt % of the metathesized natural oil, or between about 0.01 wt % and about 0.1 wt % of the metathesized natural oil.

In some embodiments, the rate of reaction between the bis(hydroxyalkyl)amine and the metathesized natural oil may be increased by heating the reaction mixture, with or without a base, to at least about 100° C., at least about 120° C., at least about 140° C., at least about 160° C., or between about 100° C. and about 200° C.

In some embodiments, the reaction between the bis(hydroxyalkyl)amine and the metathesized natural oil may be carried out at an elevated temperature of between about 80 and about 250° C., between about 120 and about 180° C., or between about 120 and about 160° C. In some embodiments, the reaction mixture may be maintained at the elevated temperature for between about 1 and about 24 hours, or between about 4 and about 24 hours. For example, the reaction mixture may be maintained at the elevated temperature for about 1 hour, about 2 hours, about 4 hours, or about 6 hours. In some embodiments, the reaction between the bis(hydroxyalkyl) amine and the metathesized natural oil may be carried out in an inert atmosphere, such as a nitrogen atmosphere or a noble gas atmosphere. In some embodiments, the reaction may be carried out in an ambient atmosphere.

After reacting the bis(hydroxyalkyl)amine and the metathesized natural oil, the reaction product may be isolated from the reaction mixture by removing volatile substances under vacuum. For example, the reaction mixture may be placed under a vacuum for between about 30 minutes and about 1 hour. Volatile substances may include but are not limited to water, solvent, unreacted amine, and/or glycerol.

The second monomer having at least two hydroxyl functional groups and including the reaction product of a metathesized natural oil and a bis(hydroxyalkyl) amine, such as the reaction product represented by Structure I above, may be used to form a polyester by a polymerization reaction with a first monomer that includes at least two carboxylate functional groups. The second monomer may have one chemical structure, or it may be a mixture of monomers having different chemical structures, where the monomers have $R_1$, $R_2$, $R_3$ and $X_1$ groups that are independently as defined for Structure I. This monomer may account for all of the monomer having at least two hydroxyl functional groups in the polyester polymerization reaction, or it may account for only a portion of the hydroxyl-functionalized monomer.

The monomers from which the polymeric substance is formed may include at least one other monomer, in addition to the first and second monomers. The optional monomers may be monomers typically used to form polyesters. For example, a third monomer may include a monomer that has at least two hydroxyl functional groups, but that does not include a group derived from a metathesized natural oil. In one example, the third monomer includes a diol monomer typically used to prepare polyesters. Examples of such diol monomers include but are not limited to ethylene glycol, diethylene glycol, triethylene glycol, tetraethylene glycol, propylene glycol, dipropylene glycol, tripropylene glycol, neopentyl glycol, 1,3-butanediol, 1,4-butanediol, 1,6-hexanediol, 1,4-di(2-hydroxyethyoxy)benzene, and the like, and combinations thereof.

In another example, the third monomer includes a prepolymer having two or more hydroxyl functional groups, such as a prepolymer in the form of a chain having two ends, where each end includes a hydroxyl functional group. Examples of such prepolymers include but are not limited to poly(alkylene ether) polyols, polyester polyols, polycarbonate polyols having molecular weights from 250 to 10,000 daltons, and the like, and combinations thereof. Poly(alkylene ether) polyols may be formed, for example, by polymerizing cyclic ethers, glycols and dihydroxyethers. Examples of poly(alkylene ether) polyols include but are not limited to poly(propylene glycol) and polytetramethylene ether glycols (PTMEG). Polyester polyols may be formed, for example, by polymerizing caprolactone or by reacting dibasic acids such as adipic, glutaric, sebacic and/or phthalic acid with diols such as ethylene glycol, 1,2-propylene glycol, 1,4-butylene glycol, diethylene glycol and/or 1,6-hexanediol, and/or with substances having three or more hydroxyl functional groups such as glycerol, trimethylolpropane, pentaerythritol and/or sorbitol. Examples of polyester polyols include but are not limited to poly(diethylene glycol adipate).

A prepolymer in the form of a chain having two ends, where each end includes a hydroxyl functional group, also may be formed from the reaction of one or more monomers having at least two carboxylate functional groups, with an excess of one or more monomers having at least two hydroxyl functional groups and not including a derivative of a metathesized natural oil.

The monomers from which the polymeric substance is formed may include a fourth monomer having a cyclic functional group, such as an epoxide or a cyclic ester. Examples of monomers having epoxide functional groups include diglycidyl ethers of bisphenol A or bisphenol F, tetraglycidyl diamine-diphenylmethane, multi-glycidyl ethers of phenol formaldehyde novolac polymers and the like, and combinations thereof. Examples of monomers that are cyclic esters include ε-caprolactone, δ-valerolactone and the like, and combinations thereof.

A polyester formed using a monomer that includes the reaction product of a metathesized natural oil and a bis(hydroxyalkyl) amine may have unique properties among polyester materials. A monofunctional monomer, such as a monomer having Structure I in which —$R_3$ is H, may be used as a chain extender in a polyester. A difunctional monomer, such as a monomer having Structure I in which —$R_3$ is a bis(hydroxyalkyl) amide group, may be used as a crosslinker in a polyester. A mixture of monofunctional and difunctional monomers may be used to provide both chain extension and crosslinking features to a polyester.

In one example, the second monomer having at least two hydroxyl functional groups and including a reaction product of a metathesized natural oil and a bis(hydroxyalkyl) amine may be used as the only hydroxyl-functional monomer in forming a polyester. In another example, the hydroxyl-functional monomers used to form a polyester may include both the second monomer and a third monomer having at least two hydroxyl functional groups, but that does not include a group derived from a metathesized natural oil. In this example, the second monomer may be used to impart unique advantages to the polyester, while the overall physical properties are determined largely by the first monomer and the third monomer. If both the second and third monomers are used to form a polyester, the molar ratio of the second monomer to the third monomer may be from about 1:1 to about 1:100.

Figure 2:
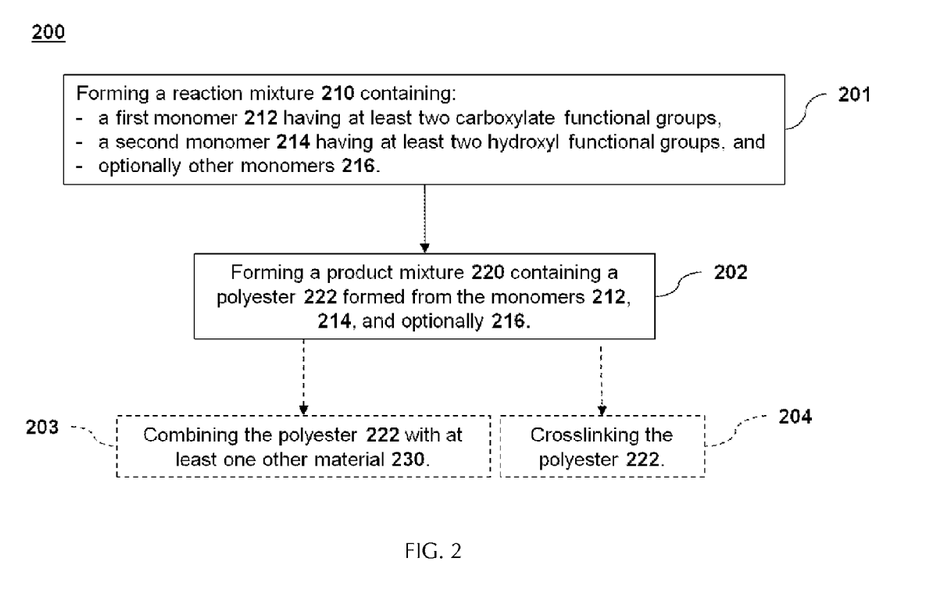
FIG. 2 depicts a method of making a polymeric composition.

FIG. 2 depicts a method 200 of making a polymeric composition. The method 200 includes forming 201 a reaction mixture 210 containing a first monomer 212 having at least two carboxylate functional groups, a second monomer 214 having at least two hydroxyl functional groups, and optionally other monomers 216; forming 202 a product mixture 220 containing a polyester 222 formed from the monomers 212, 214 and optionally 216; optionally combining 203 the polyester 222 with at least one other material 230; and/or optionally crosslinking 204 the polyester 222.

The first monomer 212 may include any substance having an anhydride group, two or more carboxylic acid groups, two or more acyl halide groups, two or more ester groups, or combinations of carboxylic acid, acyl halide, ester and anhydride groups. The first monomer 212 may include a mixture of different substances having two or more carboxylate functional groups, including a mixture of one or more diacid monomers, one or more triacid monomers, one or more diacyl halide monomers, one or more triacyl halide monomers, one or more diester monomers, one or more triester monomers, one or more anhydride monomers, one or more dianhydride monomers, and/or one or more prepolymers having two or more carboxylate functional groups.

The second monomer 214 may include any substance having at least two hydroxyl functional groups that is a reaction product of a metathesized natural oil and a bis(hydroxyalkyl) amine, as described above. The monomer 214 may include a mixture of different substances that have at least two hydroxyl functional groups and that are reaction products of a metathesized natural oil and a bis(hydroxyalkyl)amine.

The optional other monomers 216 may include a third monomer having two or more hydroxyl functional groups, but not including a derivative of a metathesized natural oil. The optional other monomers 216 may include a fourth monomer having one or more epoxide or cyclic ester functional groups.

The reaction mixture 210 also may include one or more other substances, such as a solvent, a catalyst, a filler, a stabilizer, an antioxidant, a flame retardant, a plasticizer, a colorant or dye, and/or a fragrance. Examples of catalysts for forming polyesters include but are not limited to oxides and/or salts of manganese, zinc, antimony, calcium or cobalt. Examples of fillers include but are not limited to particulate salts such as calcium carbonate, particles or fibers containing a ceramic such as glass, particles or fibers containing graphite or other forms of carbon, and particles or fibers containing a polymer.

The forming 202 a product mixture 220 containing a polyester 222 may include heating the reaction mixture 210. In some embodiments, heating the reaction mixture may include maintaining the reaction mixture at a temperature of from about 100° C. to about 300° C. for a time sufficient to form a polyester 222. In some embodiments, the reaction mixture temperature may be from about 110° C. to about 250° C., from about 120° C. to about 200° C., from about 125° C. to about 150° C., or from about 130° C. to about 140° C. In some embodiments, the reaction mixture may be maintained at a temperature within these ranges for a period of from about 1 hour to about 48 hours, including but not limited to from about 1 hour to about 24 hours, and from about 2 hours to about 8 hours. A polyester 222 may be formed at a lower temperature and/or within a shorter period of time if the reaction mixture 210 includes a catalyst for forming polyester, such as those described above.

The optionally combining 203 the polyester 222 with at least one other material 230 may include forming a homogenous or heterogeneous blend of the polyester 222 with another polymer. The optionally combining 203 may include combining the polyester 222 with particles or fibers containing another polymer, a ceramic and/or graphite to provide a polymeric product such as a film or a monolithic object. For example, polyester fibers may be spun or woven with fibers of another material to provide a composite textile material. The optionally combining 203 may include combining the polyester 222 with a monomer or prepolymer for another polymer, and then polymerizing the monomer or prepolymer. The optionally combining 203 may include forming a layered film containing the polyester 222 and another material. For example, a film containing a polyester layer and a metal layer may provide a flexible barrier material.

The optionally crosslinking 204 the polyester 222 may include exposing the polyester 222 to a crosslinking agent. Examples of crosslinking agents include substances having two or more functional groups that can react with ester groups in the polymer chain. Examples of substances having two or more functional groups that can react with residual carboxylic acid, acyl halide, ester, anhydride or hydroxyl groups in the polymer. Crosslinking agents may include substances having two or more functional groups such as carboxylic acid groups, acyl halide groups, ester groups, anhydride groups or hydroxyl groups, or having a combination of these groups.

Examples of crosslinking agents also include substances having two or more functional groups that may react with the carbon-carbon double bonds in the group derived from the metathesized natural oil. Examples of such substances include but are not limited to sulfur, divinyl benzene, prepolymers having carbon-carbon double bonds at or near their chain ends, and combinations thereof.

Figure 3:
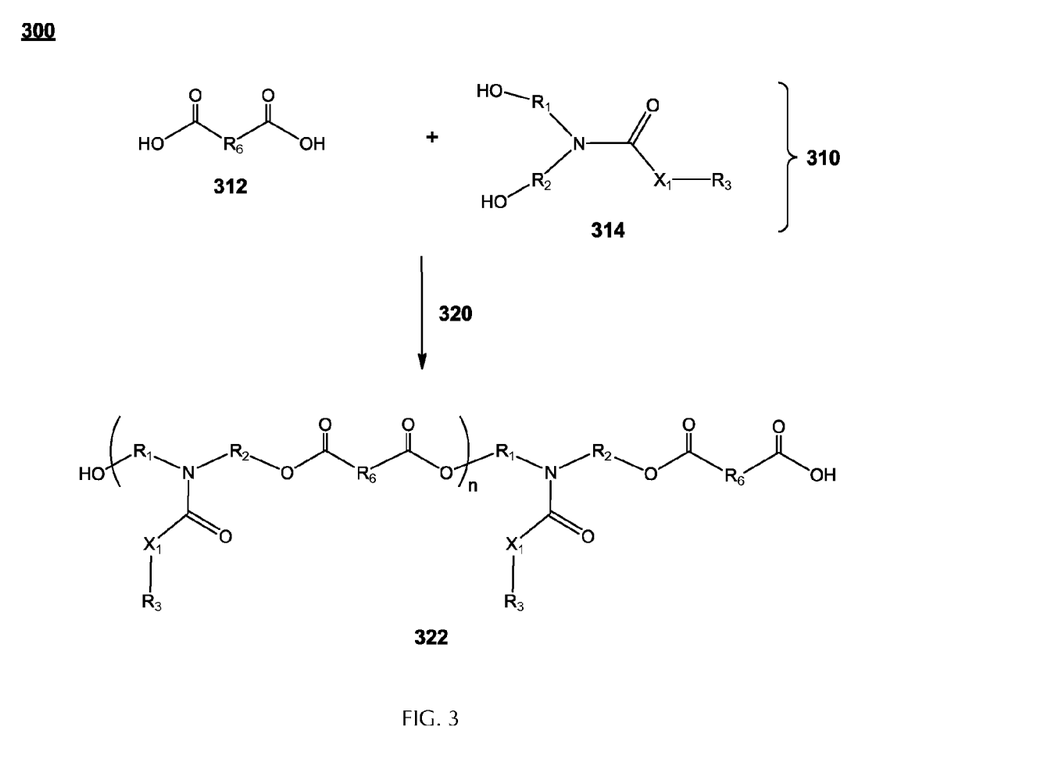
FIG. 3 depicts a representative reaction scheme for a polymerization of a monomer having at least two carboxylic acid functional groups, and a monomer having at least two hydroxyl functional groups, where the monomer having at least two hydroxyl functional groups includes a group derived from a metathesized natural oil.

FIG. 3 depicts chemical structures and reaction schemes for an example of a method 300 of making a polyester. Method 300 includes forming a reaction mixture 310 containing a first monomer 312 having at least two carboxylic acid functional groups and a second monomer 314 having at least two hydroxyl functional groups, and subjecting the reaction mixture to reaction conditions 320 to produce a product mixture containing a polyester 322.

The first monomer 312 may be any dicarboxylic acid. The $R_6$ group may be an alkyl group, an aryl group, or a mixture of these groups.

The second monomer 314 is the reaction product of a metathesized natural oil and a bis(hydroxyalkyl)amine, as defined above for Structure I. The monomer 314 may have one chemical structure, or it may be a mixture of monomers having different chemical structures, where the monomers have $R_1$, $R_2$, $R_3$ and $X_1$ groups that are independently as defined for Structure I.

The reaction mixture 310 may include other monomers besides monomers 312 and 314. Examples of other monomers include other monomers having one or more hydroxyl functional groups, and monomers having one or more epoxide or cyclic ester functional groups.

The reaction conditions 320 may include heating the reaction mixture 310 to an elevated temperature and/or pressure, for a period of time sufficient to form a product mixture containing a polyester 322. In addition to polyester 322, the product mixture may include one or more of monomers 312 or 314, one or more other ingredients of the initial reaction mixture, and/or byproducts of the polymerization reaction.

Figure 4:
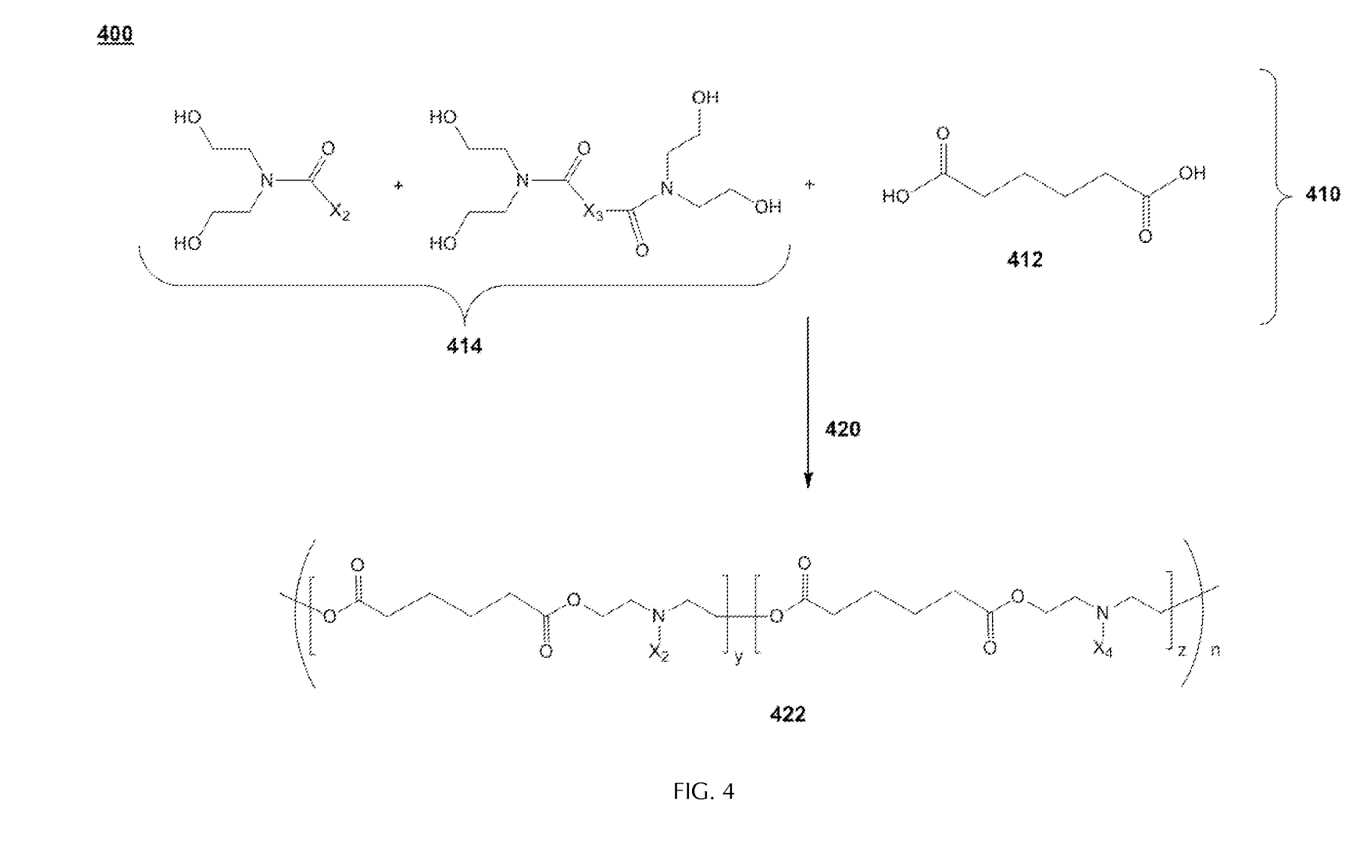
FIG. 4 depicts a representative reaction scheme for a polymerization of adipic acid with a monomer having at least two hydroxyl functional groups, where the monomer having at least two hydroxyl functional groups includes a group derived from a metathesized natural oil.

FIG. 4 depicts chemical structures and reaction schemes for an example of a method 400 of making a polyester. Method 400 includes forming a reaction mixture 410 containing a first monomer 412 having at least two carboxylic acid functional groups and a second monomer 414 having at least two hydroxyl functional groups, and subjecting the reaction mixture to reaction conditions 420 to produce a product mixture containing a polyester 422. The first monomer 412 is adipic acid. The second monomer 414 is a mixture of monomers that are reaction products of a metathesized natural oil and diethanolamine, where $X_2$ and $X_3$ independently are $C_4$-$C_{28}$ alkyl groups or alkenyl groups from the metathesized natural oil. In polyester 422, $X_2$ is a $C_4$-$C_{28}$ alkyl group or alkenyl group from the metathesized natural oil, $X_4$ is a $C_4$-$C_{28}$ alkyl group or alkenyl group from the metathesized natural oil that is bonded to another polymer chain through a C—N bond, and y, z and n are at least 1. The metathesized natural oil is the product of a metathesis reaction of a natural oil in the presence of a metathesis catalyst, as described above. Preferably the metathesized natural oil is metathesized soybean oil (MSBO).

Figure 5:
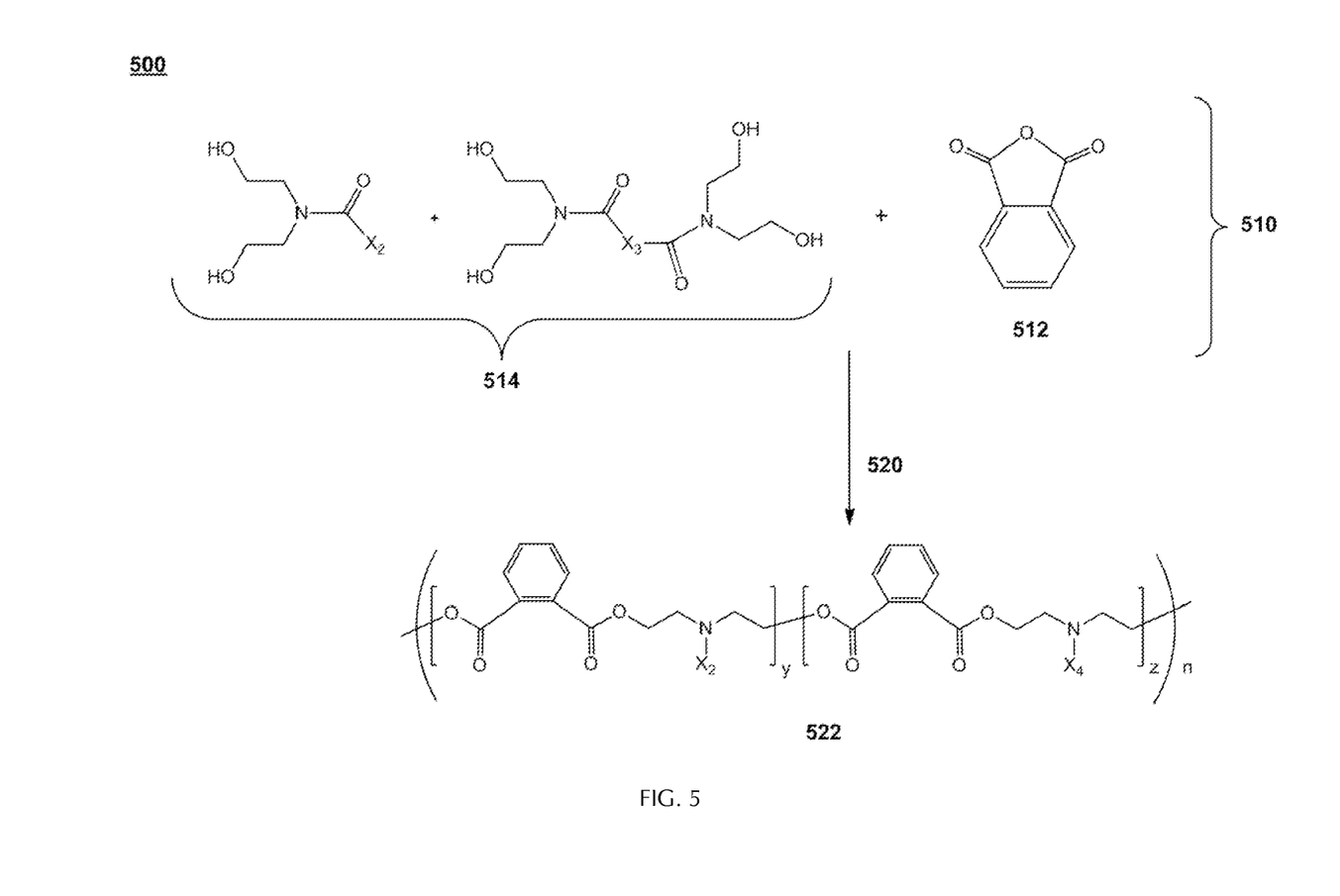
FIG. 5 depicts a representative reaction scheme for a polymerization of phthalic anhydride with a monomer having at least two hydroxyl functional groups, where the monomer having at least two hydroxyl functional groups includes a group derived from a metathesized natural oil.

FIG. 5 depicts chemical structures and reaction schemes for another example of a method 500 of making a polyester. Method 500 includes forming a reaction mixture 510 containing a first monomer 512 having an anhydride functional group and a second monomer 514 having at least two hydroxyl functional groups, and subjecting the reaction mixture to reaction conditions 520 to produce a product mixture containing a polyester 522. The first monomer 512 is phthalic anhydride. The second monomer 514 is a mixture of monomers that are reaction products of a metathesized natural oil and diethanolamine, where $X_2$ and $X_1$ independently are $C_4$-$C_{28}$ alkyl groups or alkenyl groups from the metathesized natural oil. In polyester 522, $X_2$ is a $C_4$-$C_{28}$ alkyl group or alkenyl group from the metathesized natural oil, $X_4$ is a $C_4$-$C_{28}$ alkyl group or alkenyl group from the metathesized natural oil that is bonded to another polymer chain through a C—N bond, and y, z and n are at least 1. The metathesized natural oil is the product of a metathesis reaction of a natural oil in the presence of a metathesis catalyst, as described above. Preferably the metathesized natural oil is metathesized soybean oil (MSBO).

The natural oil derived portion of the polymers represented in FIG. 4 and FIG. 5 was determined by presuming a molar ratio of 3 parts of the first monomer to 1 part of the second monomer mixture. The second monomer mixture was presumed to be an approximately 50/50 mix of the two hydroxyl functional group monomer and the four hydroxyl functional group monomer, thus giving a 1:1 carboxylic acid to hydroxyl ratio. The low weight percent was determined using all $C_4$ alkyl or alkenyl groups, while the high weight percent was determined using all $C_{28}$ alkyl or alkenyl groups. The masses were determined as shown below in Table A.

TABLE A

| | a | b | c | d | e | f | g |
|---|---|---|---|---|---|---|---|
| Name | Adipic acid | Phthalic anhydride | Diethanolamine | $C_4$ 2-OH | $C_4$ 4-OH | $C_{28}$ 2-OH | $C_{28}$ 4-OH |
| Mass | 146.14 | 148.1 | 105.14 | 102.13 | 146.14 | 438.75 | 482.76 |

From these determined masses, the low weight percent polyester of FIG. 4 was determined (d+e/3a+c+d+e) to be about 31.3% (M.W./M.W.) natural oil derived, while the high weight percent polyester of FIG. 4 was determined (f+g/3a+c+f+g) to be about 62.9% (M.W./M.W.) natural oil derived. Similarly, the low weight percent polyester of FIG. 5 was determined (d+e/3a+c+d+e) to be about 31.1% (M.W./M.W.) natural oil derived, while the high weight percent polyester of FIG. 5 was determined (f+g/3a+c+f+g) to be about 62.6% (M.W./M.W.) natural oil derived. Thus, as the carbon count of the alkyl or alkenyl groups increases, the natural oil derived portion of the resulting polyester also increases.

The following examples and representative procedures illustrate features in accordance with the present teachings, and are provided solely by way of illustration. They are not intended to limit the scope of the appended claims or their equivalents, and numerous variations can be made to the following examples that lie within the scope of these claims.

EXAMPLES

Example 1

Formation of Hydroxyl-Functional Monomer

A monomer having at least two hydroxyl functional groups was formed by reacting a metathesized natural oil and a bis(hydroxyalkyl)amine. Diethanolamine (150 grams (g)) and potassium t-butoxide (3.5 g) were combined in a flask equipped with a condenser, and the mixture was heated to 115° C. and stirred. To this mixture, metathesized soybean oil (MSBO; 400 g) was added dropwise. Table 1 lists the reactants present in the reaction mixture.

TABLE 1

Reactants used to form monomer having at least two hydroxyl groups

|  | MSBO | Diethanolamine | potassium t-butoxide |
|---|---|---|---|
| molecular weight | 200* | 105.14 g/mol | 112.21 g/mol |
| mass | 400 g | 150 g | 3.5 g |
| moles | 1.426 | 1.427 | 0.312 |
| equivalents | 1 | 1 | 0.022 |

*saponification value

The mixture was maintained at 115° C. for 1.5 hours after the MSBO addition was complete. The mixture was allowed to cool, and was then dissolved in diethyl ether, washed with a saturated sodium chloride solution, and dried. The ether was removed from the product by rotary evaporation to provide d mixture of monomers having at least two hydroxyl functional groups and containing a group derived from the MSBO.

Characterization of the product by Fourier Transform Infrared Spectroscopy (FTIR) was consistent with full conversion of the ester groups in the MSBO to N,N-diethanolamide groups. The hydroxyl value (OHV) was determined to be 285, which corresponds to 5.079 millimoles of hydroxyl groups per gram. While neither desiring to be bound by any particular theory nor intending to limit in any measure the scope of the appended claims or their equivalents, it is presently believed that the product may be represented by Structure III:

Structure III where $X_2$ and $X_3$ independently are $C_4$-$C_{28}$ alkyl groups or alkenyl groups from the MSBO.

Example 2

Formation of a Polyester Using Adipic Acid

A polymer was formed by reacting a first monomer having at least two carboxylate functional groups and a second monomer having at least two hydroxyl functional groups, where the second monomer having at least two hydroxyl functional groups is the reaction product of a metathesized natural oil and a bis(hydroxyalkyl) amine. The second monomer having at least two hydroxyl functional groups was the monomer of Example 1. The first monomer having at least two carboxylate functional groups was adipic acid, a dicarboxylic acid.

The monomer of Example 1, adipic acid and toluene were combined in a flask, and the mixture was heated to 130-135° C. and stirred for 1 hour. Table 2 lists the amounts of the monomer having at least two hydroxyl functional groups of Example 1 (M) and of the adipic acid (AA; 146.14 grams per mole) used in three separate polymerization reactions. The equivalents of the monomer (M) are expressed in units of millimoles of hydroxyl groups (mmol OH), and the equivalents of the carboxylic acid (AA) are expressed in units of millimoles of carboxylic acid groups (mmol C(=O)OH). The completion of the polymerization reaction was determined by the extent to which hydroxyl groups had reacted.

TABLE 2

Reactants used to form polyesters

|  |  | A | B | C |
|---|---|---|---|---|
| M | grams | 15 | 15 | 15 |
|  | equivalents (mmol OH) | 76.2 | 76.2 | 76.2 |
| AA | grams | 1.29 | 7.7 | 8.35 |
|  | equivalents (mmol C(=O)OH) | 18 | 105 | 114 |
| AA:M | Molar Ratio | 1:0.2 | 1:1.4 | 1:1.5 |
|  | Toluene (mL) | 20 | 20 | 20 |
|  | Temperature (° C.) | 130 | 135 | 135 |
|  | Reaction complete? | no | nearly | yes |

Characterization of the products by Fourier Transform Infrared Spectroscopy (FTIR) was consistent with the formation of ester groups from the hydroxyl and carboxylic acid groups of the monomers. While neither desiring to be bound by any particular theory nor intending to limit in any measure the scope of the appended claims or their equivalents, it is presently believed that the product of reaction C may be represented by Structure IV:

Structure IV where $X_2$ is a $C_4$-$C_{28}$ alkyl group or alkenyl group from the metathesized natural oil, $X_4$ is a $C_4$-$C_{28}$ alkyl group or alkenyl group from the metathesized natural oil that is bonded to another polymer chain through a C—N bond, and y, z and n independently are at least 1. As the monomer having at least two hydroxyl functional groups of Example 1 (M) was formed from MSBO, $X_2$ in this example is a $C_4$-$C_{28}$ alkyl group or alkenyl group from the MSBO, and $X_4$ is a $C_4$-$C_{28}$ alkyl group or alkenyl group from the MSBO that is bonded to another polymer chain through a C—N bond.

Example 3

Formation of a Polyester Using Phthalic Anhydride

A polymer was formed by reacting a first monomer having at least two carboxylate functional groups and a second monomer having at least two hydroxyl functional groups, where the second monomer having at least two hydroxyl functional groups is the reaction product of a metathesized natural oil and a bis(hydroxyalkyl) amine. The second monomer having at least two hydroxyl functional groups was the monomer of Example 1. The first monomer having at least two carboxylate functional groups was phthalic anhydride (148.12 grams per mole).

The monomer of Example 1 (15 g; 76.2 mmol OH), phthalic anhydride (8.46 g; 114 mmol C=O) and toluene (20 mL) were combined in a flask, and the mixture was heated to 135° C. and stirred for 1 hour. Characterization of the product by FTIR was consistent with complete conversion of the hydroxyl groups into ester groups.

In a larger reaction, the monomer of Example 1 (200 g; 1.016 mol OH), phthalic anhydride (80 g; 1.080 mol C=O) and toluene (250 mL) were combined in a flask, which was equipped with a Dean-Starke trap containing 75 mL toluene. The mixture was heated to 135° C. and stirred for 1 hour. Characterization of the product by FTIR was consistent with complete conversion of the hydroxyl groups into ester groups.

While neither desiring to be bound by any particular theory nor intending to limit in any measure the scope of the appended claims or their equivalents, it is presently believed that the product of these reactions may be represented by Structure V:

Structure V where $X_2$ is a $C_4$-$C_{28}$ alkyl group or alkenyl group from the metathesized natural oil, $X_4$ is a $C_4$-$C_{28}$ alkyl group or alkenyl group from the metathesized natural oil that is bonded to another polymer chain through a C—N bond, and y, z and n independently are at least 1. As the monomer having at least two hydroxyl functional groups of Example 1 (M) was formed from MSBO, $X_2$ in this example is a $C_4$-$C_{28}$ alkyl group or alkenyl group from the MSBO, and $X_4$ is a $C_4$-$C_{28}$ alkyl group or alkenyl group from the MSBO that is bonded to another polymer chain through a C—N bond.

To provide a clear and more consistent understanding of the specification and claims of this application, the following definitions are provided.

The term "polymeric" refers to a substance that includes a polymer.

The term "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks.

The term "monomer" refers to a substance that can undergo a polymerization reaction to contribute constitutional units to the chemical structure of a polymer.

The term "prepolymer" refers to a polymer that can undergo further reaction to contribute constitutional units to the chemical structure of a different polymer. The definitions for "polymer", 'monomer' and "prepolymer" are derived from IUPAC, *Pure Appl. Chem.*, Vol. 68, No. 8, pp. 1591-1595, 1996.

The terms "reaction" and "chemical reaction" refer to the conversion of a substance into a product, irrespective of reagents or mechanisms involved.

The term "reaction product" refers to a substance produced from a chemical reaction of one or more reactant substances.

The term "alkyl group" refers to a group formed by removing a hydrogen from a carbon of an alkane, where an alkane is an acyclic or cyclic compound consisting entirely of hydrogen atoms and saturated carbon atoms.

The term "alkenyl group" refers to a group formed by removing a hydrogen from a carbon of an alkene, where an alkene is an acyclic or cyclic compound consisting entirely of hydrogen atoms and carbon atoms, and including at least one carbon-carbon double bond.

The term "functional group" refers to a group that includes one or a plurality of atoms other than hydrogen and sp³ carbon atoms. Examples of functional groups include but are not limited to hydroxyl (—OH), protected hydroxyl, ether (—C—O—C—), ketone (>C=O), ester (—C(=O)O—C—), carboxylic acid (—C(=O)OH), cyano (—C≡N), amido (—C(=O)NH—C—), iso-cyanate (—N=C=O), urethane (—O—C(=O)—NH—), urea (—NH—C(=O)—NH—), protected amino, thiol (—SH), sulfone, sulfoxide, phosphine, phosphite, phosphate, halide (—X), and the like.

The term "metathesis catalyst" refers to any catalyst or catalyst system configured to catalyze a metathesis reaction.

The terms "metathesize" and "metathesizing" refer to a chemical reaction involving a single type of olefin or a plurality of different types of olefin, which is conducted in the presence of a metathesis catalyst, and which results in the formation of at least one new olefin product. The phrase "metathesis reaction" encompasses cross-metathesis (a.k.a. co-metathesis), self-metathesis, ring-opening metathesis (ROM), ring-opening metathesis polymerizations (ROMP), ring-closing metathesis (RCM), and acyclic diene metathesis (ADMET), and the like, and combinations thereof.

The terms "natural oils", "natural feedstocks", or "natural oil feedstocks" mean oils derived from plants or animal sources. The term "natural oil" includes natural oil derivatives, unless otherwise indicated. Examples of natural oils include but are not limited to vegetable oils, algal oils, animal fats, tall oils, derivatives of these oils, combinations of any of these oils, and the like. Examples of vegetable oils include but are not limited to canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, castor oil, and the like, and combinations thereof. Examples of animal fats include but are not limited to lard, tallow, poultry fat, yellow grease, fish oil, and the like, and combinations thereof. Tall oils are by-products of wood pulp manufacture. A natural oil may be refined, bleached, and/or deodorized.

The term "natural oil derivatives" refers to compounds or mixtures of compounds derived from one or more natural oils using any one or combination of methods known in the art. Such methods include but are not limited to saponification, transesterification, esterification, hydrogenation (partial or full), isomerization, oxidation, reduction, and the like, and combinations thereof. Examples of natural oil derivatives include but are not limited to gums, phospholipids, soapstock, acidulated soapstock, distillate or distillate sludge, fatty acids and fatty acid alkyl ester such as 2-ethylhexyl ester, hydroxy-substituted variations thereof of the natural oil, and the like, and combinations thereof. For example, the natural oil derivative may be a fatty acid methyl ester (FAME) derived from the glyceride of the natural oil.

The term "metathesized natural oil" refers to the metathesis reaction product of a natural oil in the presence of a metathesis catalyst, where the metathesis product includes a new olefinic compound. A metathesized natural oil may include a reaction product of two triglycerides in a natural feedstock (self-metathesis) in the presence of a metathesis catalyst, where each triglyceride has an unsaturated carbon-carbon double bond, and where the reaction product includes a "natural oil oligomer" having a new mixture of olefins and esters that may include one or more of metathesis monomers, metathesis dimers, metathesis trimers, metathesis tetramers, metathesis pentamers, and higher order metathesis oligomers (e.g., metathesis hexamers). A metathesized natural oil may include a reaction product of a natural oil that includes more than one source of natural oil (e.g., a mixture of soybean oil and palm oil). A metathesized natural oil may include a reaction product of a natural oil that includes a mixture of natural oils and natural oil derivatives. A metathesized natural oil may include a cross-metathesis reaction product of a natural oil with another substance having a carbon-carbon double bond, such as an olefin or ethylene.

The foregoing detailed description and accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent and that such new combinations are to be understood as forming a part of the present specification.

What is claimed is:

1. A polymeric composition, comprising:
   the reaction product of monomers, the monomers comprising
   a first monomer having at least two carboxylate functional groups, and
   a second monomer having at least two hydroxyl functional groups;
   where the second monomer is a reaction product of a metathesized natural oil and a bis(hydroxyalkyl)amine.

2. The polymeric composition of claim 1, where the natural oil is selected from the group consisting of vegetable oils, algal oils, animal fats, tall oils, derivatives thereof, and combinations thereof.

3. The polymeric composition of claim 1 where the natural oil is selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, castor oil, lard, tallow, poultry fat, yellow grease, fish oil, tall oils, and combinations thereof.

4. The polymeric composition of claim 1, where the bis(hydroxyalkyl)amine is selected from the group consisting of bis(2-hydroxypropyl)amine, N,N-2-hydroxypropyl-ethanolamine, diethanolamine, and combinations thereof.

5. The polymeric composition of claim 1, the monomers further comprising a third monomer having at least two hydroxyl functional groups,
   where the third monomer does not include a group derived from a metathesized natural oil.

6. The polymeric composition of claim 5, where the third monomer is selected from the group consisting of ethylene glycol, diethylene glycol, triethylene glycol, tetraethylene glycol, propylene glycol, dipropylene glycol, tripropylene glycol, neopentyl glycol, 1,3-butanediol, 1,4-butanediol, 1,6-hexanediol, 1,4-di(2-hydroxyethyoxy)benzene, a poly(alkylene ether) polyol prepolymer, a polyester polyol prepolymer, a polycarbonate polyol prepolymer, and combinations thereof.

7. The polymeric composition of claim 5, where the molar ratio of the second monomer to the third monomer is from about 1:1 to about 1:100.

8. The polymeric composition of claim 1, where the first monomer is a diacid selected from the group consisting of malonic acid, succinic acid, glutaric acid, adipic acid, suberic acid, azelaic acid, sebacic acid, dodecanedioic acid, terephthalic acid, 2,6-naphthalic acid, a prepolymer having at least two carboxylic acid groups, and combinations thereof.

9. The polymeric composition of claim 1, where the first monomer is a diacyl halide selected from the group consisting of malonyl chloride, succinyl chloride, glutaryl chloride, adipoyl chloride, suberyl chloride, azelaoyl chloride, sebacyl chloride, dodecanedioyl chloride, terephthaloyl chloride, 2,6-naphthaloyl chloride, a prepolymer having at least two acyl halide groups, and combinations thereof.

10. The polymeric composition of claim 1, where the first monomer is a diester selected from the group consisting of dimethyl malonate, dimethyl succinate, dimethyl glutarate, dimethyl adipate, dimethyl suberate, dimethyl azelate, dimethyl sebacate, dimethyl dodecanoate, dimethyl terephthate, 2,6-dimethyl naphthate, a prepolymer having at least two methyl ester groups, and combinations thereof.

11. The polymeric composition of claim 1, where the first monomer is an anhydride selected from the group consisting of succinic anhydride, glutaric anhydride, phthalic anhydride, naphthalic anhydride, a prepolymer having at least two anhydride groups, and combinations thereof.

12. The polymeric composition of claim 1, where
the first monomer comprises adipic acid, and
the second monomer comprises a reaction product of metathesized soybean oil and diethanolamine.

13. The polymeric composition of claim 12, where the molar ratio of the first monomer to the second monomer is from about 1:1 to about 1:1.5.

14. The polymeric composition of claim 1, where
the first monomer comprises phthalic anhydride, and
the second monomer comprises a reaction product of metathesized soybean oil and diethanolamine.

15. The polymeric composition of claim 14, where the molar ratio of the first monomer to the second monomer is from about 1:1 to about 1:1.5.

16. A method of making a polymeric composition, comprising:
forming a reaction mixture comprising
a first monomer having at least two carboxylate functional groups, and
a second monomer having at least two hydroxyl functional groups,
where the second monomer is the reaction product of a metathesized natural oil and a bis(hydroxyalkyl) amine; and
forming a product mixture comprising a polyester formed from the first monomer and the second monomer.

17. The method of claim 16, where the second monomer is the reaction product of:
a metathesized natural oil selected from the group consisting of vegetable oils, algal oils, animal fats, tall oils, derivatives thereof, and combinations thereof, and
a bis(hydroxyalkyl)amine selected from the group consisting of bis(2-hydroxy-propyl)amine, N,N-2-hydroxypropyl-ethanolamine, diethanolamine, and combinations thereof.

18. The method of claim 17, where
the first monomer comprises adipic acid,
the second monomer comprises a reaction product of metathesized soybean oil and diethanolamine, and
the forming comprises heating the reaction mixture at a temperature of from about 130 to about 140° C.

19. The method of claim 17, where
the first monomer comprises phthalic anhydride,
the second monomer comprises a reaction product of metathesized soybean oil and diethanolamine, and
the forming comprises heating the reaction mixture at a temperature of from about 130 to about 140° C.

20. The method of claim 16, where the reaction mixture further comprises at least one other monomer selected from the group consisting of a third monomer having at least two hydroxyl functional groups, and a fourth monomer having at least one epoxide or cyclic ester functional group.

21. The polymeric composition of claim 1, where a natural oil derived portion of the composition is at least 30%.

22. The polymeric composition of claim 1, where a natural oil derived portion of the composition is from about 30% to about 63%.

23. The method of claim 16, where a natural oil derived portion of the polyester is at least 30%.

24. The method of claim 16, where a natural oil derived portion of the polyester is from about 30% to about 63%.

25. The polymeric composition of claim 1, where the metathesized natural oil comprises at least one of a metathesis dimer, metathesis trimer, metathesis trimer, and metathesis tetramer.

26. The method of claim 16, where the metathesized natural oil comprises at least one of a metathesis dimer, metathesis trimer, metathesis trimer, and metathesis tetramer.

* * * * *